P. E. LANE.
MACHINE FOR AND METHOD OF SCARFING METAL.
APPLICATION FILED DEC. 19, 1918.
1,313,901.
Patented Aug. 26, 1919.
14 SHEETS—SHEET 4.
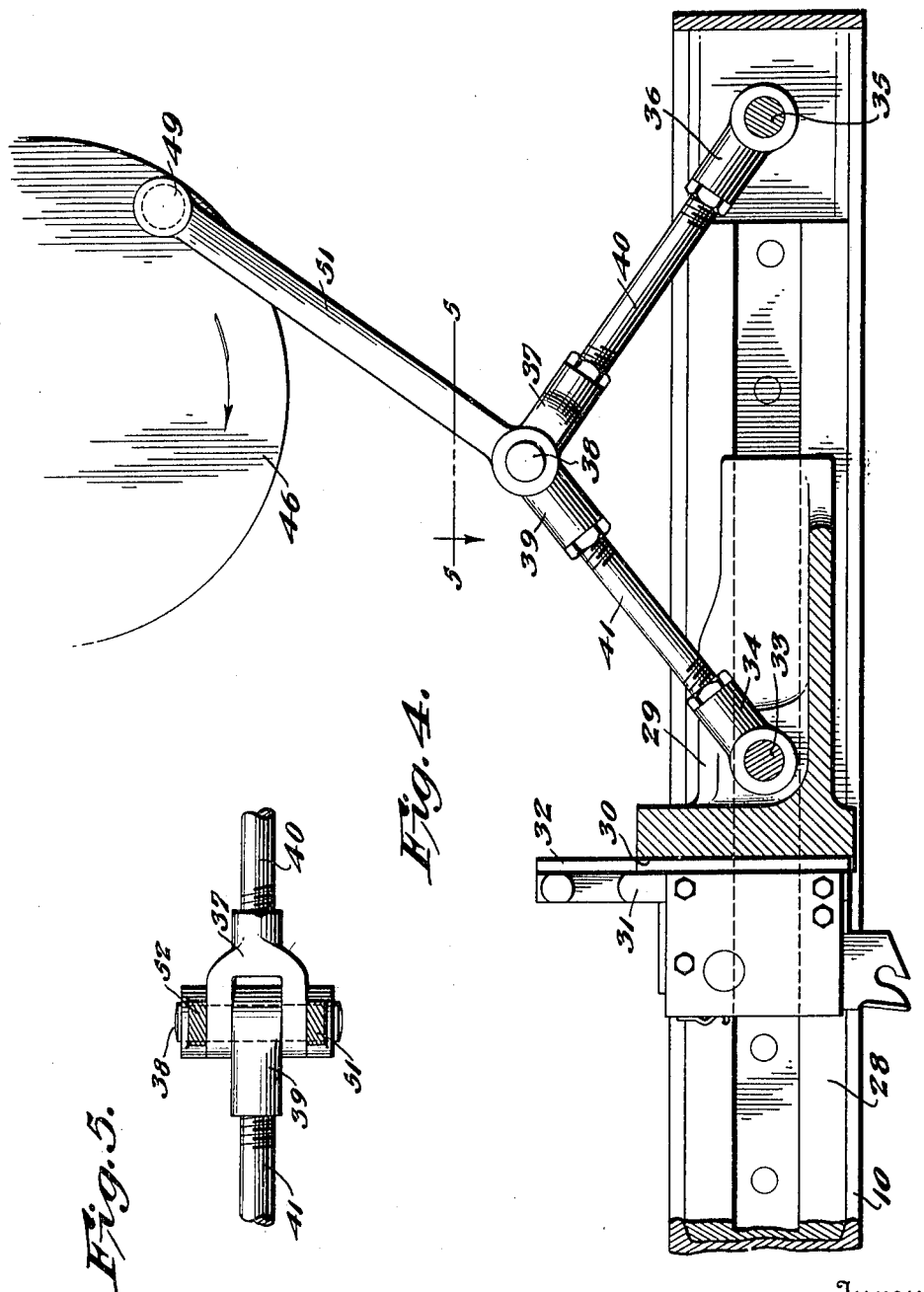

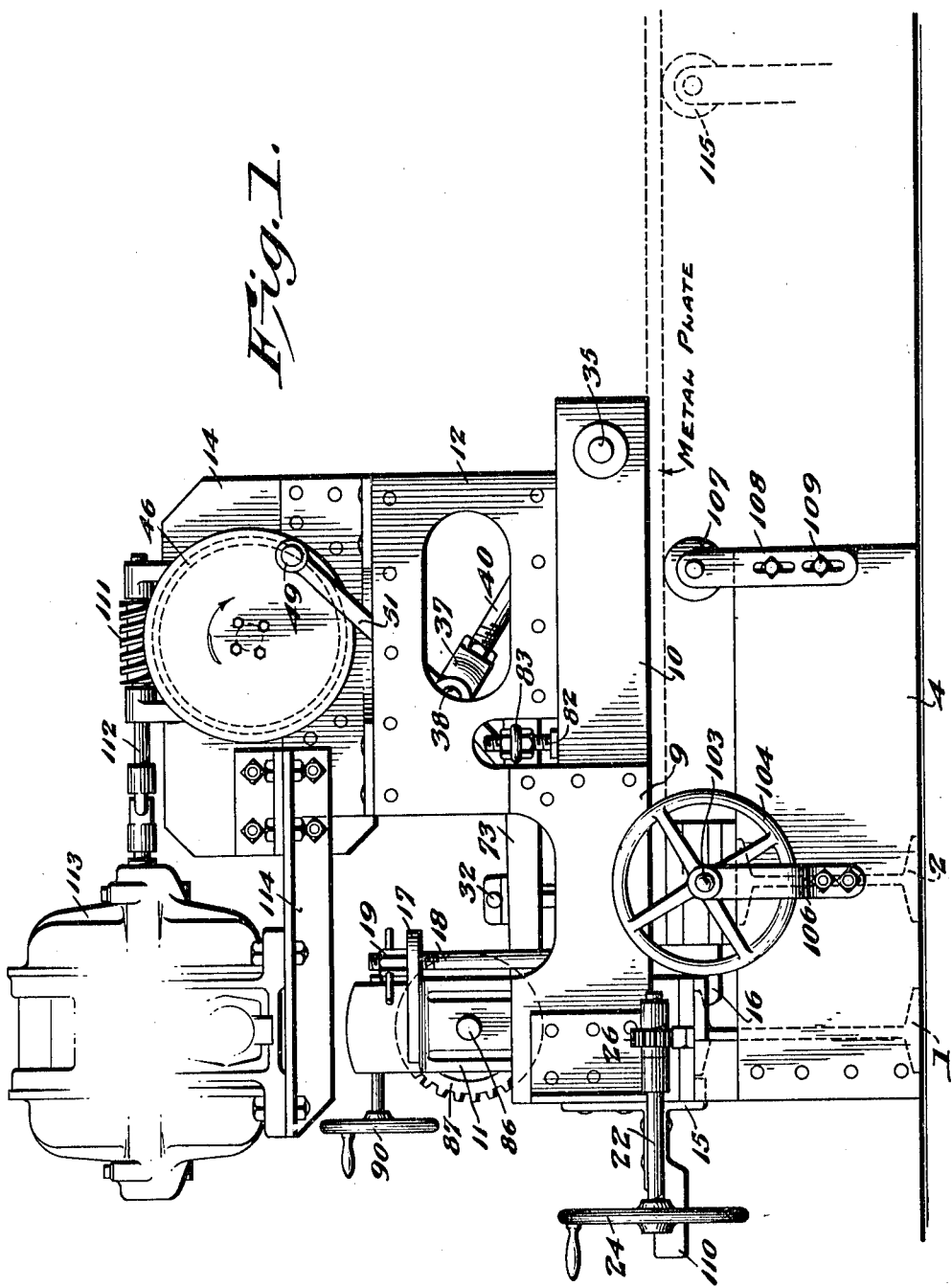

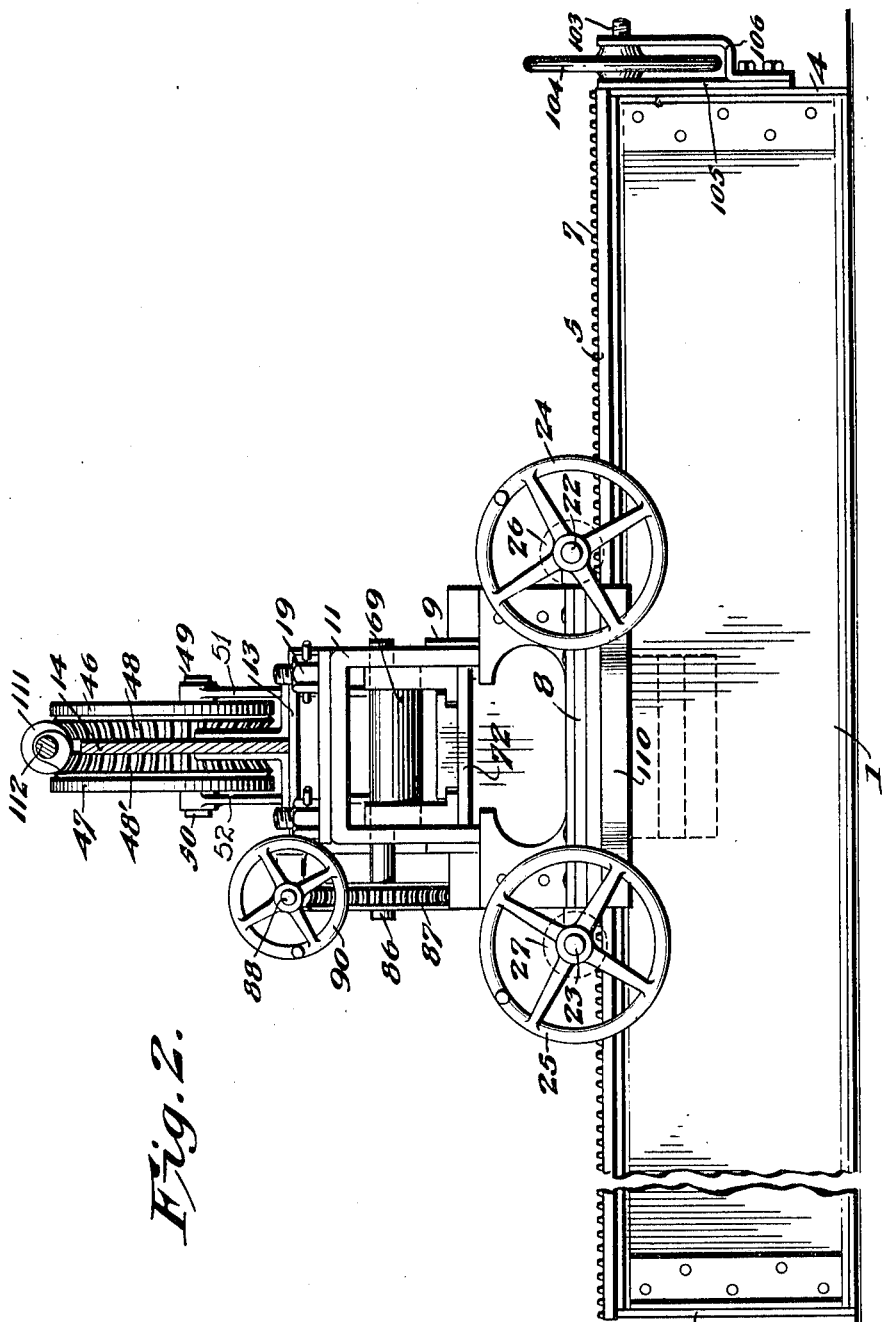

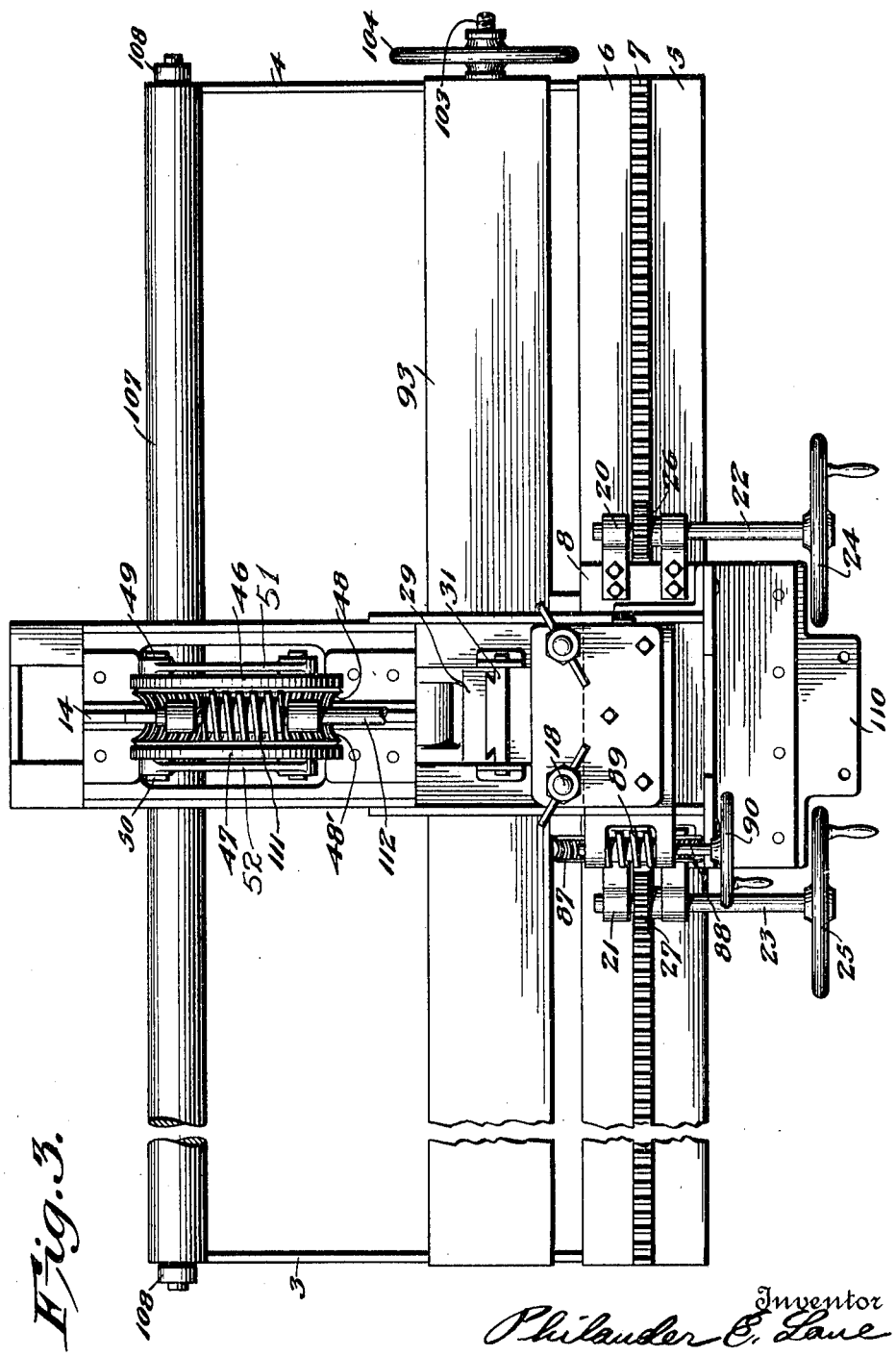

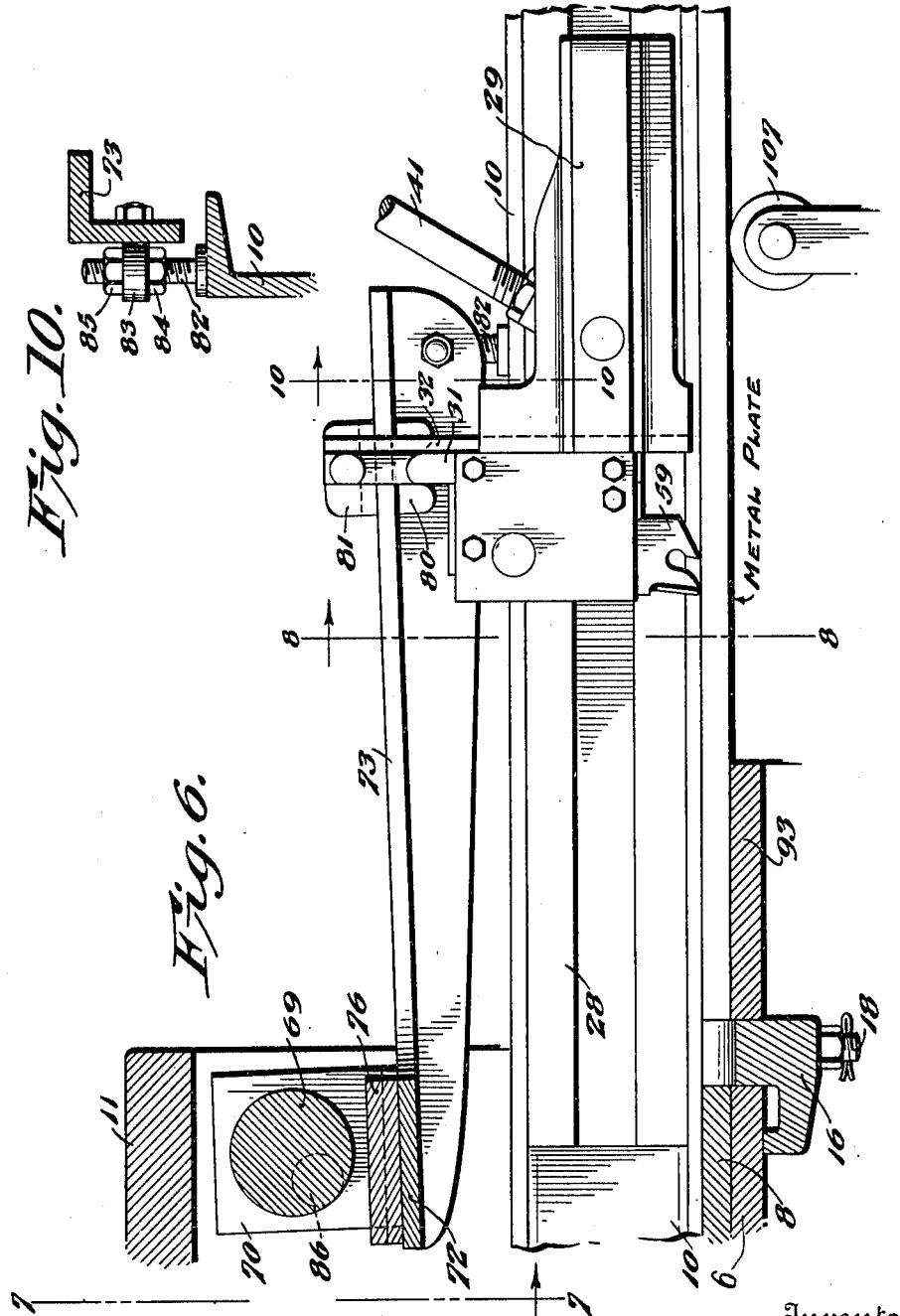

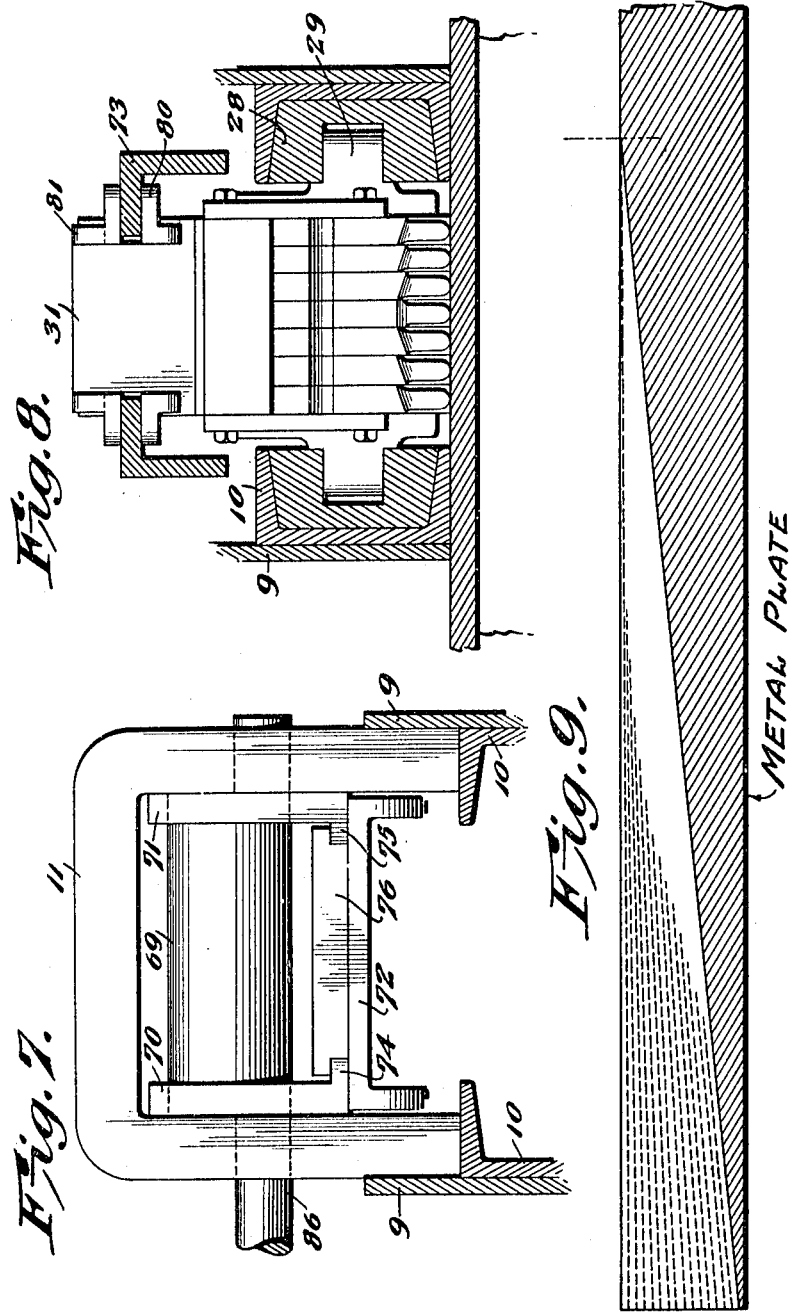

P. E. LANE.
MACHINE FOR AND METHOD OF SCARFING METAL.
APPLICATION FILED DEC. 19, 1918.
1,313,901.
Patented Aug. 26, 1919.
14 SHEETS—SHEET 7.
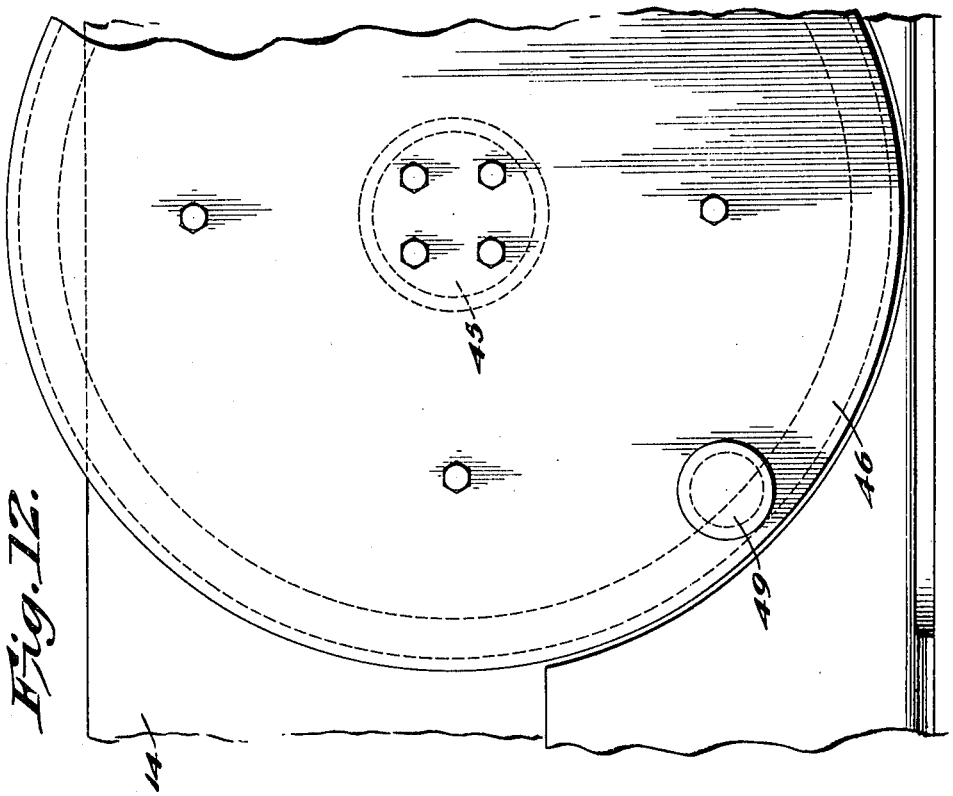
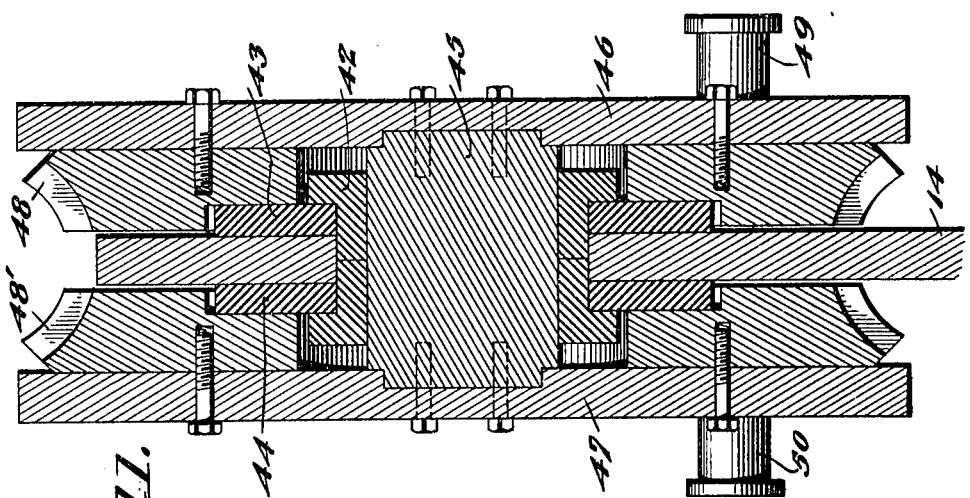
Inventor
Philander E. Lane
By Lloyd W. Patch
his Attorney P. E. LANE.
MACHINE FOR AND METHOD OF SCARFING METAL.
APPLICATION FILED DEC. 19, 1918.
1,313,901.
Patented Aug. 26, 1919.
14 SHEETS—SHEET 8.
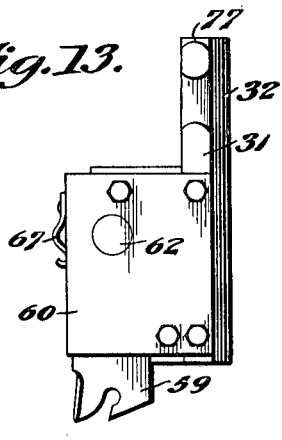
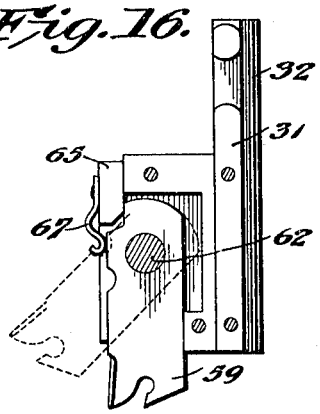
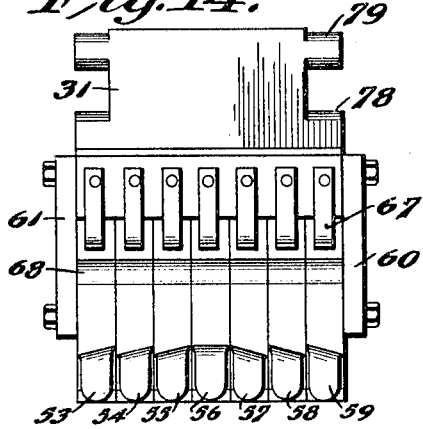
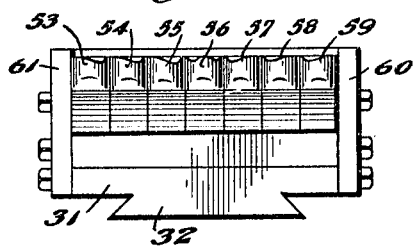
Inventor
Philander E. Lane
By Lloyd W. Patch
his Attorney

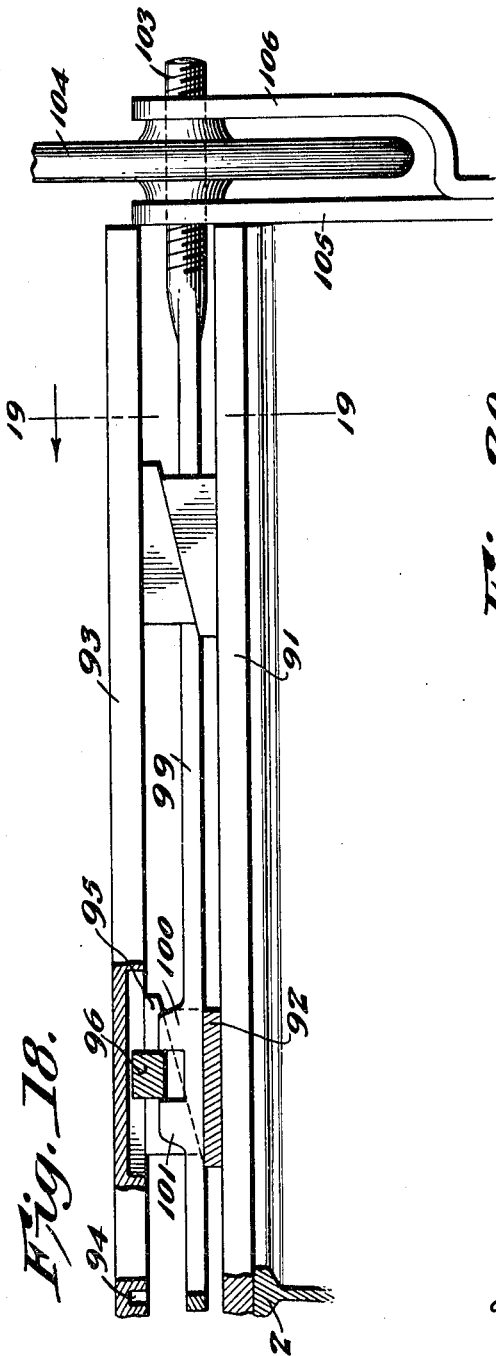
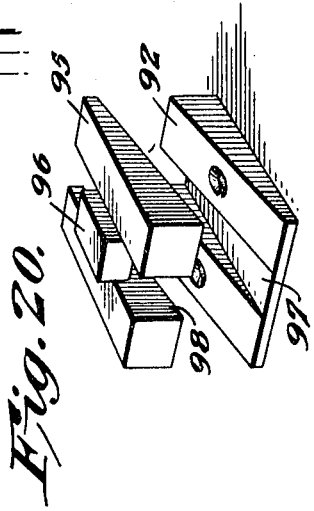
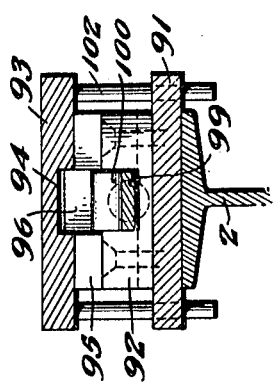

P. E. LANE.
MACHINE FOR AND METHOD OF SCARFING METAL.
APPLICATION FILED DEC. 19, 1918.
1,313,901.
Patented Aug. 26, 1919.
14 SHEETS—SHEET 10.
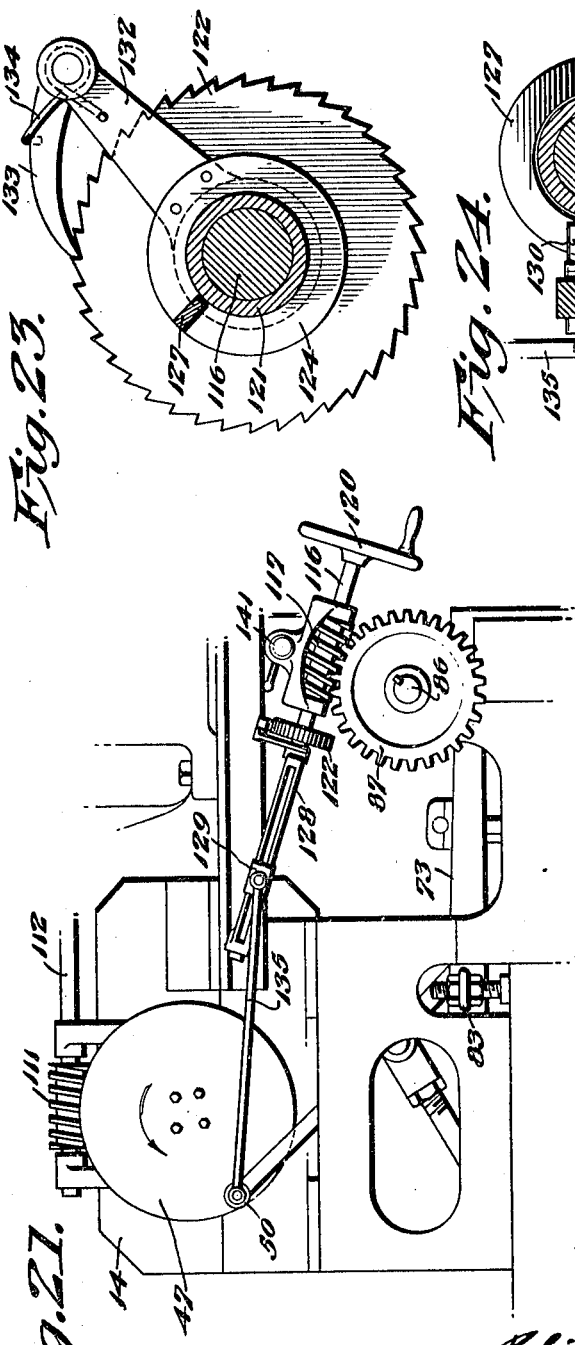
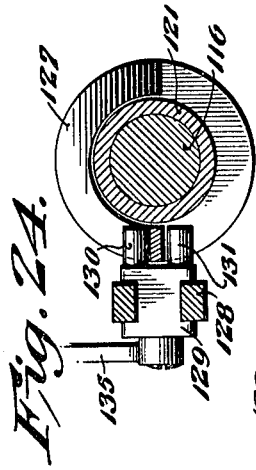
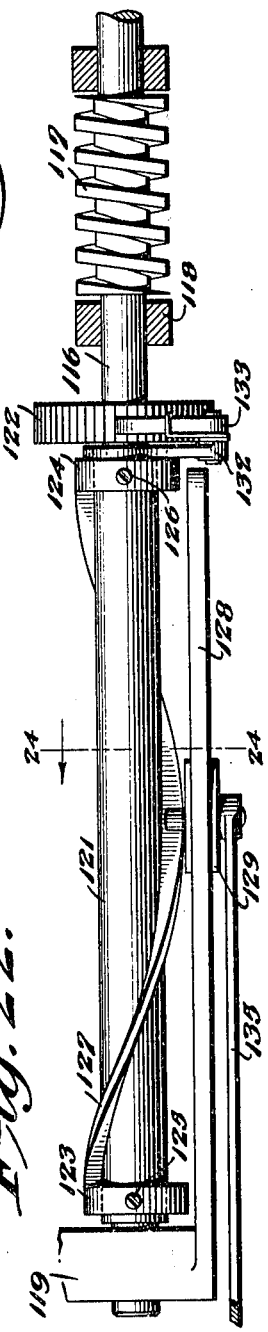
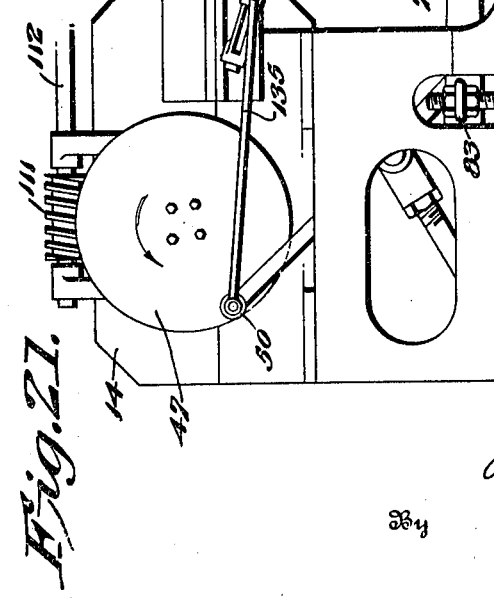
Inventor
Philander E. Lane
By Lloyd W. Patch
his Attorney P. E. LANE.
MACHINE FOR AND METHOD OF SCARFING METAL.
APPLICATION FILED DEC. 19, 1918.
1,313,901.
Patented Aug. 26, 1919.
14 SHEETS—SHEET 11.
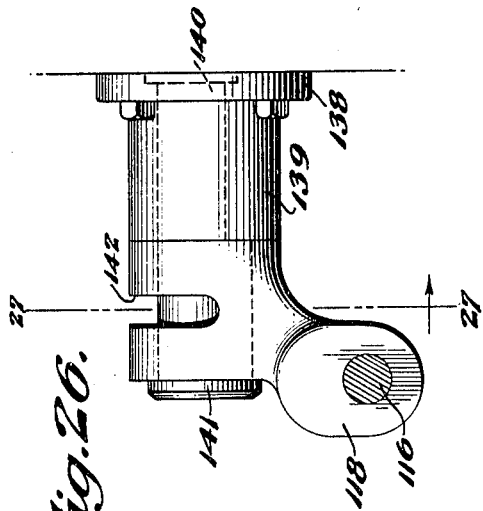
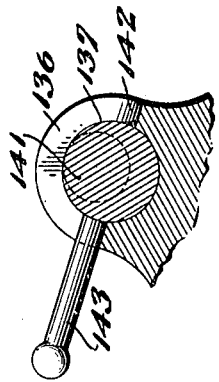
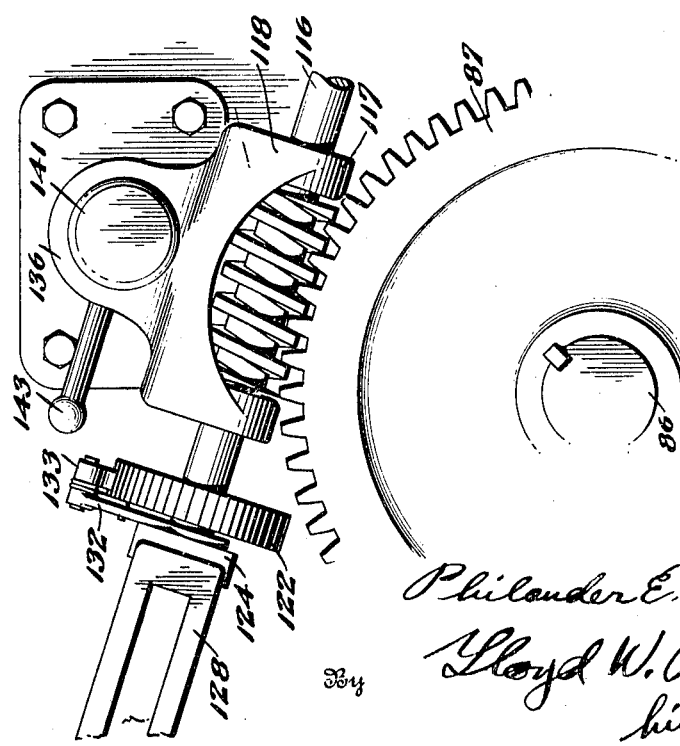
Inventor
Philander E. Lane
By Lloyd W. Patch
his Attorney

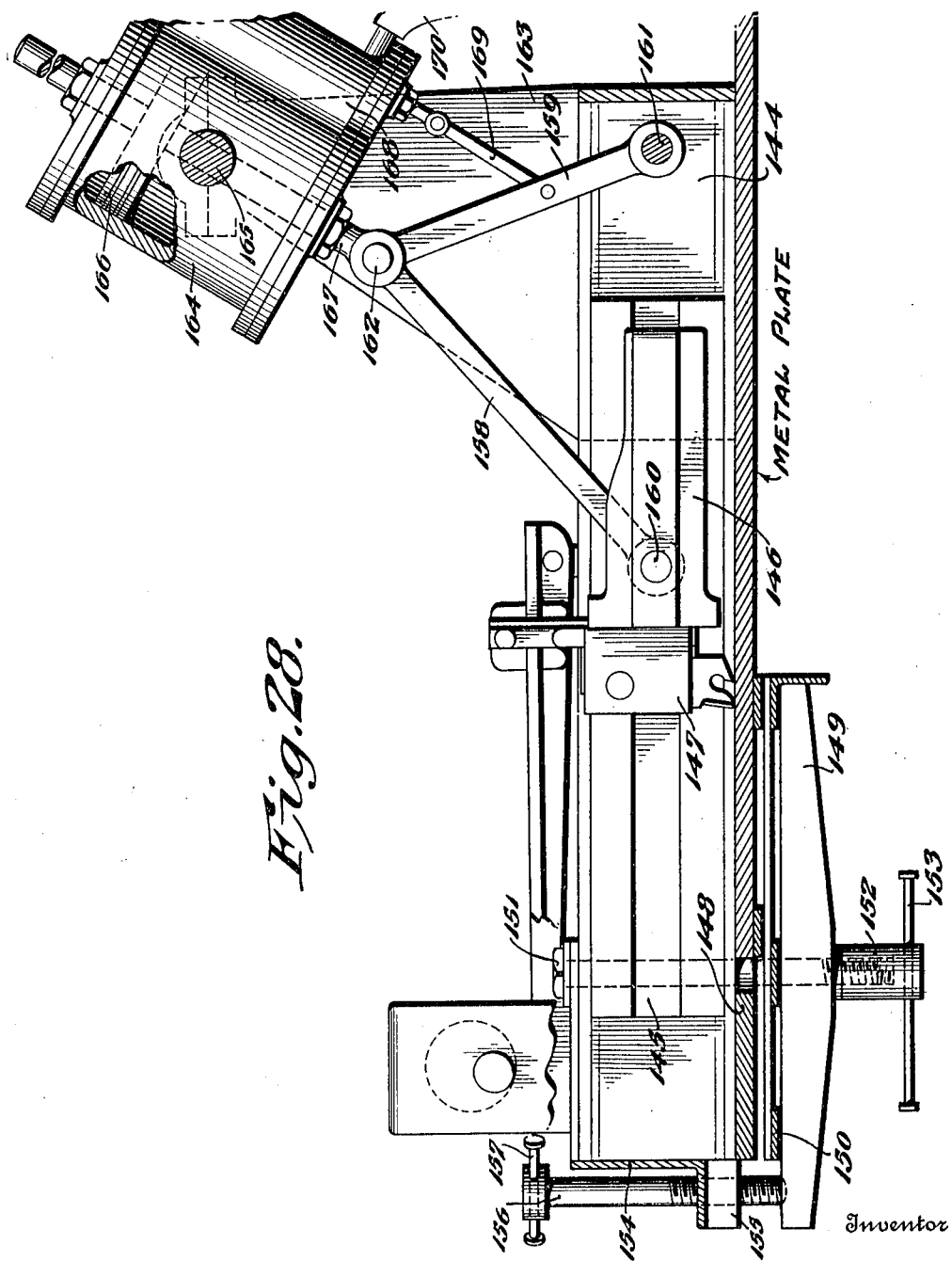

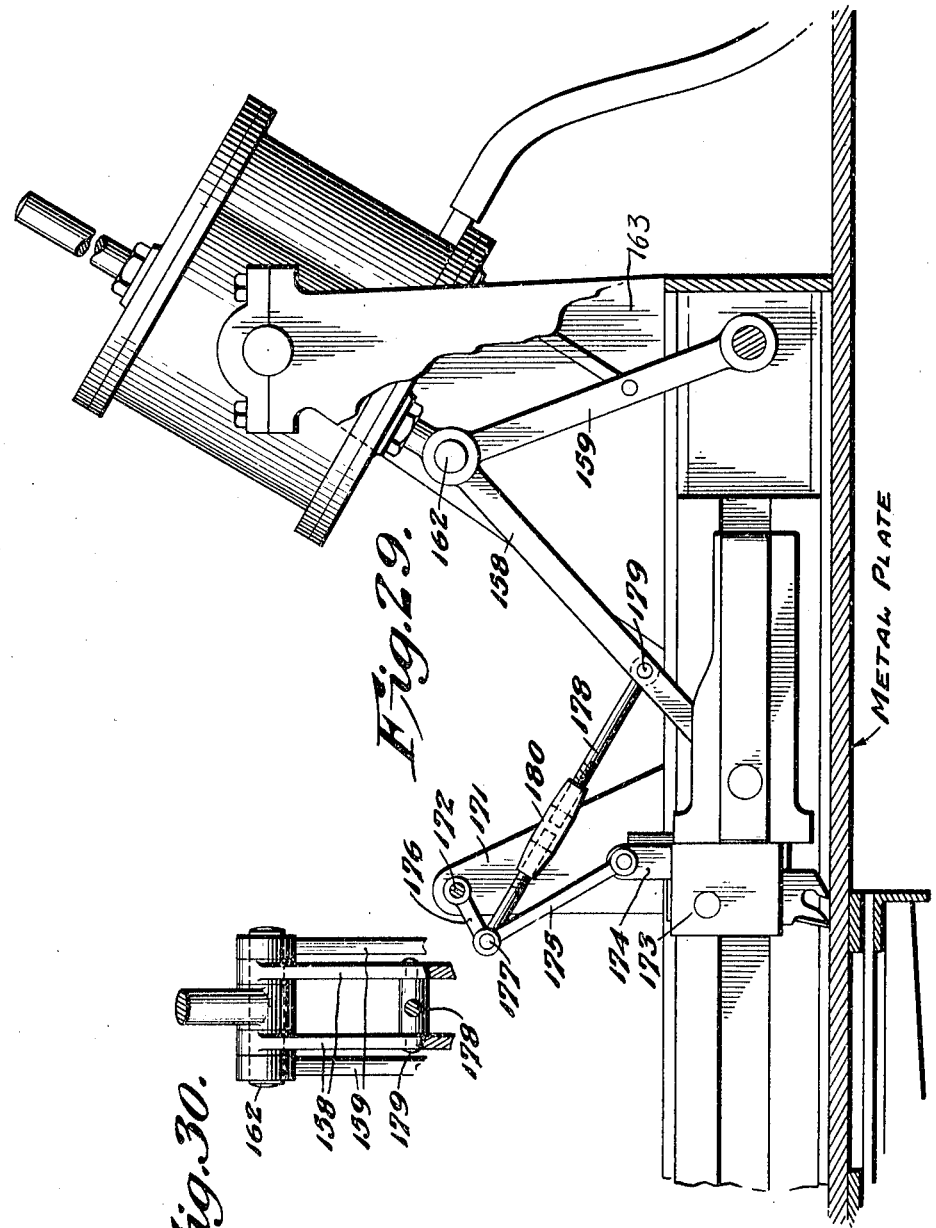

P. E. LANE.
MACHINE FOR AND METHOD OF SCARFING METAL.
APPLICATION FILED DEC. 19, 1918.
1,313,901.
Patented Aug. 26, 1919.
14 SHEETS—SHEET 14.
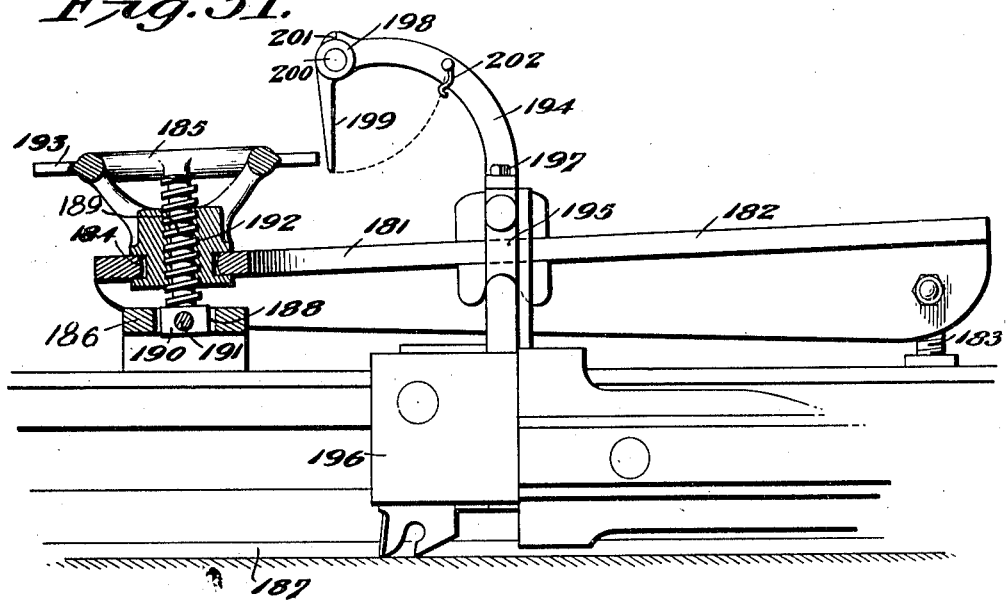
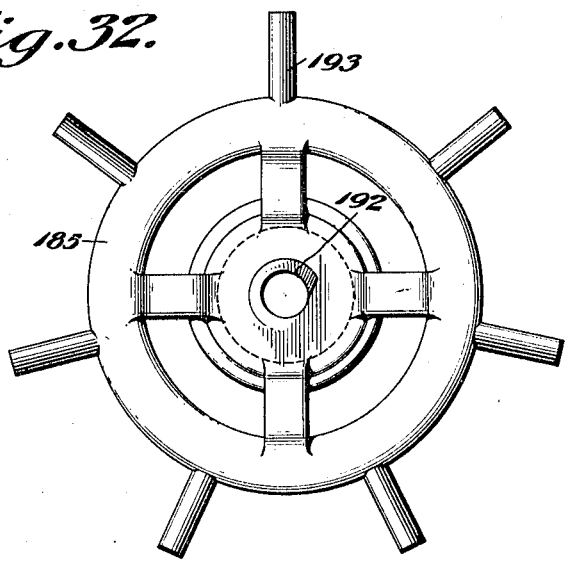

UNITED STATES PATENT OFFICE.

PHILANDER E. LANE, OF ATLANTIC CITY, NEW JERSEY.

MACHINE FOR AND METHOD OF SCARFING METAL.

1,313,901.  Specification of Letters Patent.  Patented Aug. 26, 1919.

Application filed December 19, 1918. Serial No. 267,500.

*To all whom it may concern:*

Be it known that I, PHILANDER E. LANE, a citizen of the United States, residing at Atlantic City, in the county of Atlantic and State of New Jersey, have invented new and useful Improvements in Machines for and Methods of Scarfing Metal, of which the following is a specification.

My present invention relates to a machine for and method of scarfing metal, and particularly as applied to the forming of inclined cuts or scarfs in metal ship-plates for reception of frame members or for lap joints, and in other like connections.

An object is to provide a machine, and method, by which inclined, circular or straight scarfs can be cut expeditiously and efficiently, and which minimize the power requirements for use.

A second object is to provide a cutter and an arrangement of toggle links for moving the same in a cutting path, the connection of the toggle links being such that from the starting point of the cutting stroke the speed of movement is gradually decreased while the moving force upon the cutter is increased up to the end of such stroke.

Another object resides in arranging means by which the cutter is adjusted to take a deepening cut as the power of the stroke is increased, which means can be adjusted to start the stroke with the cutter above the metal and to deepen the cut to a maximum depth which the tool will stand.

A further object is to associate with a cutter head a plurality of tools arranged to be set as a gang cutter or to be selectively moved from cutting positions to thus cut different widths of scarf without side feed.

Still another object is to so construct the cutters proper that on a single stroke the metal is gouged along the line to be cut and a smoothing cut is taken.

A still further object is to provide means by which the length of cut as well as the depth can be varied.

An additional purpose lies in arranging means to clamp and hold the parts in proper working position with respect to a ship-plate or the like, to thus insure that the scarfs will be cut at the points desired.

Yet another object is to provide mechanical means by which the parts are adjusted to cut in the middle portion or at the edges of plates to be scarfed.

One other purpose resides in arranging a cylinder and fluid actuated piston to impart movement through the toggle links to the cutter, which mechanism efficiently accomplishes a decrease in the speed of movement of and an increase in the power applied to the cutter.

Furthermore it is my object to provide a method of scarfing metal by the use of a moving cutter which consists in initiating movement of the cutter, continuing the travel with decreasing speed and increasing power applied, and deepening the cut.

With the above and other objects in view, which will be apparent from the drawings, specification and claims, my invention includes certain novel features of construction and combinations of parts which will now be set forth.

In the drawings:

Figure 1 is a view in side elevation of the preferred embodiment of my invention.

Fig. 2 is a front elevation of the structure of Fig. 1.

Fig. 3 illustrates the machine in top plan.

Fig. 4 is a view partly in section showing the toggle link arrangement by which the cutter is moved.

Fig. 5 is a fragmentary sectional view on line 5—5 of Fig. 4.

Fig. 6 is a detail view showing the structure by which the depth of cut is varied and cutting feed is accomplished.

Fig. 7 is a sectional view on line 7—7 of Fig. 6.

Fig. 8 is a view in section taken on line 8—8 of Fig. 6.

Fig. 9 is a sectional view through a plate which has been scarfed and with the individual cuts indicated by the dotted lines.

Fig. 10 is a detail view in section on line 10—10 of Fig. 6.

Fig. 11 is a vertical sectional view through the toggle link operating disks and the bearing mounting therefor.

Fig. 12 is a fragmentary view in elevation of the structure disclosed in Fig. 11.

Fig. 13 is a view in side elevation of the cutter head.

Fig. 14 is a view in front elevation of the cutter head.

Fig. 15 shows the cutter head in bottom plan and illustrates the manner of sharpening the cutting tools.

Fig. 16 is a view similar to Fig. 13 with the side plate of the cutter head removed to show the mounting of the cutting tools.

Fig. 17 is an enlarged detail to better show a representative cutting tool.

Fig. 18 is a broken view with parts in section showing the plate clamping means.

Fig. 19 is a sectional view on line 19—19 of Fig. 18.

Fig. 20 is a perspective view showing the wedge blocks by which the plate clamping structure is operated.

Fig. 21 is a view in elevation showing the preferred form of automatic cutter depth feed.

Fig. 22 is a detail view showing the adjustable feed screw.

Fig. 23 is a sectional view to better show the feed ratchet.

Fig. 24 is a detail sectional view on line 24—24 of Fig. 22.

Fig. 25 is an elevational view showing the means by which the automatic cutter feed is thrown out of operation.

Fig. 26 is an elevational view at right angles to the disclosure in Fig. 25.

Fig. 27 is a sectional view on line 27—27 of Fig. 26.

Fig. 28 is a view partly in elevation and partly in section showing a modified form of the machine.

Fig. 29 is a fragmentary view disclosing parts of the structure embodied in Fig. 28 and illustrating another form of cutter depth feed.

Fig. 30 is a detail view illustrating the knuckle joint embodied in the machine shown in Fig. 29.

Fig. 31 is a fragmentary view of the machine showing still another form of cutter depth feed.

Fig. 32 is a detail view to better disclose the operating parts of the adaptation illustrated in Fig. 31.

While the machine as contemplated in my invention is adaptable for use in a number of different connections to scarf or cut metal in inclined, circular, or straight lines, I have in Fig. 1 et seq, illustrated the particular adaptation and construction for working upon ship-plates and the like and with the parts constructed and arranged to cut inclined scarfs. In the preferred embodiment, as shown in Fig. 1, the machine is constructed to be set and made stationary at a fixed point, the plates to be operated upon being brought to the machine, clamped in place and scarfed, and then removed.

As here shown, the supporting structure is made up of the I-beams 1 and 2 placed to be parallel and held in slightly spaced position by end plates 3 and 4. While it will of course be understood that I do not wish to be limited to particular sizes in connection with any of the parts of the machine, it is desirable that I-beam 1 be somewhat larger than beam 2, and I have found that in a machine constructed to work upon plates specified beams 1 and 2, fifteen inches and twelve inches high respectively are well suited. The lower flanges of beams 1 and 2, upon which the machine rests, can be drilled to receive holding-down bolts, or the machine can be mounted and held against movement by other approved means.

Upon the upper flange of beam 1 slide bars 5 and 6 are secured, a rack bar 7 being mounted between the slide bars. A base member 8 is mounted to move on the slide bars 5 and 6 and has a groove to clear rack bar 7. Side plates 9 and channel bars 10 are secured on the base member 8 to form a supporting car structure on which the operating parts of the machine are mounted and carried. The plates and channel bars are securely fastened on base member 8, and the channel bars, with their channels facing, extend at right angles to beam 1 over and beyond beam 2.

A U-shaped frame member 11 is secured in inverted mounting between side plates 9 with its ends bearing upon channel bars 10, above base member 8, and at the extending ends of the channel bars frame plates 12 having supporting plate 13 secured thereon are mounted. Upon the frame structure built up of plates 12 and 13, a bearing plate 14 is fixed to stand in a vertical plane at a point centered between channel bars 10.

The parts mentioned above, mounted on base member 8, form the car and supporting frame by which the operating parts of the machine are carried. Base member 8 slides upon bars 5 and 6, and guide plate 15 secured to base member 8 is shaped to catch beneath bar 5, while a guide and clamp member 16, best shown in Fig. 6, catches beneath the edge of bar 6. A bracket plate 17 is carried by the U-shaped frame 11, and guide and clamp member 16 is suspended by clamp bolts 18 received through openings in this bracket plate. Clamp nuts 19 are provided on the screw threaded ends of bolts 18 above plate 17 to draw up member 16 against bar 6 and thus clamp and hold the car structure against sliding movement along bars 5 and 6.

It will of course be understood that nuts 19 are turned to bring member 16 to the clamping position only when the car is to be set and held in a fixed position, and while the car might be manually slid along the bars to adjusted positions, it is desirable that means be provided whereby movement can be more expeditiously accomplished. With this purpose in view, I provide bearings 20 and 21 at opposite sides of base burner 8, in which shafts 22 and 23 having hand wheels 24 and 25 mounted thereon are journaled. These shafts 22 and 23 have pinions 26 and 27 fixed thereon and in mesh with the teeth of rack bar 7. When the car, as built up on base member 8, is to be adjusted, clamp nuts 19 are loosened to release member 16, and then by turning hand wheels 24 and 25 pinions 26 and 27 are caused to engage with the teeth of the rack bar and slide the structure along bars 5 and 6. When the clamp nuts 19 are again tightened the adjustment is fixed.

Cast iron guide ways 28 are fitted and secured in the channel ways of bars 10, and a slide head 29 is fitted to move within the guide ways. This slide head has a dovetailed way 30 cut vertically in the forward face thereof, and a cutter head 31 is provided with a dovetailed spline portion 32 which fits slidably in way 30, thus mounting the cutter head to carry with the slide head and to have movement vertically with respect thereto. A wrist pin 33 is passed through openings in the slide head 29 and a knuckle joint member 34 is pivoted thereon. A pin 35 mounted between channel bars 10 at the extended extremities thereof forms a pivot bearing for knuckle joint 36. A bifurcated knuckle joint member 37 has openings through which wrist pin 38 is received, and knuckle joint member 39 is pivoted on this pin within the bifurcation of member 37. The knuckle joint members 34, 36, 37, and 39 are provided with screw threaded openings, and rods 40 and 41 are fitted to the openings so that members 36 and 37 with rod 40 form a toggle link pivoted at one end on pin 35 and hinging at its opposite end on wrist pin 38, while member 39 also hinged on this pin is connected by rod 41 with member 34 to form a toggle link pivoted on wrist pin 33.

Bearing plate 14, referring now particularly to the disclosure in Figs. 11 and 12, has a bushing 42 mounted in an opening provided in the middle portion thereof, bearing rings 43 and 44 being held in place by the bushing. A bearing spindle 45 journaled in bushing 42 has crank disks 46 and 47 secured thereto on opposite sides of the bearing plate by means of cap screws or other fastenings. The spindle 45 is made sufficiently long that clearance is provided on each side of bearing plate 14, and in this clearance space the two parts 48 and 48′ of a worm gear are fitted. Bolts or other fastenings are employed to fix the two-part worm gear in conjunction with disks 46 and 47, and this worm gear structure is recessed to clear the edges of bearing rings 43 and 44 and to present face bearings to these rings to hold the structure against lateral shifting.

Crank bearings 49 and 50 are provided in alinement and in eccentric location on disks 46 and 47, and links 51 and 52 are journaled on these crank bearings and are pivoted at their opposite ends on wrist pin 38. By this connection of parts, as disks 46 and 47 are revolved movement is imparted to the toggle link arrangement and the slide head 29 is given reciprocatory movement in guide ways 28, the cutter head consequently also having this reciprocatory movement.

While the cutter head might be constructed in any desired manner and might carry tools of any approved form, it is desirable that a gang of cutting tools be employed, that these tools be mounted in such a way that they can be swung into and out of cutting position, selectively, to thus allow for variation in the width of the scarf. Also, it is desirable that the cutting tools be constructed and mounted to require a minimum of power to turn the crank disks. For these reasons it is desirable that cutting tools with mountings as shown in Figs. 13 to 17 inclusive, be used. As illustrated, seven cutting tools, 53, 54, 55, 56, 57, 58, and 59, are used, and these are mounted between the sides 60 and 61 of the cutter head 31 by means of a pivot pin 62. As will be seen by reference to Fig. 17, the cutting tools are made comparatively short and thick to thus secure maximum strength, and on their cutting ends are recessed and beveled to form gouging and finish cutting edges 63 and 64. To take the strain from the pivot pin 62, a bar 65 is provided across the front of the cutter head and the cutting tools have shoulders 66 which catch behind this bar. A spring retention finger 67 is provided for each of the cutter tools, and each tool has a notch 68 in which the corresponding retention finger catches to hold the tool in a position shown in dotted lines in Fig. 16. As shown more clearly in Fig. 14, the gouging edges of the cutting tools are rounded to take a gouging or rough cut, while the cutting edge 64 is straight to give a smoothing cut, and a straight planed surface when acting in conjunction with adjacent cutter tools. Also it is desirable that the strain upon the cutting tools be reduced to a minimum, and therefore the tools 53, 54, and 55 are ground on their forward faces to bevel inwardly and backwardly, while tools 57, 58, and 59 are given a reverse bevel, this reversal being made to guard against slide slipping which might occur if the tools be all beveled to one angle. The central cutting tool 56 might be beveled to correspond with either group, or this tool can be straight ground.

As has been stated, the dovetailed rib 32 of the cutter head 31 is received to slide in the dovetailed way 30 of slide head 29, and thus provision is made to adjust the cutter head to vary the depth of cut as made by the tools. This adjustment might be made manually, but to insure best results it is necessary that means be provided to hold and guide the cutter head in a proper working path as the slide head 29 is reciprocated. To accomplish this purpose the structure disclosed in Figs. 6, 7, 8, and 10 can be employed to advantage. A cam roller 69 is revolubly mounted transversely across the U-shaped frame 11, and this cam roller has the bearing blocks 70 and 71 received around the ends thereof. A guide member 72 includes the side bars 73 made in the form of slides and connected by a crossbar. The bearing blocks 70 and 71 have inwardly extending flanges 74 and 75, and a block 76 secured on the crossbar of the guide member 72 is recessed at its edges to receive the flange portions 74 and 75 in a sliding fit.

Cutter head 31 is provided with an extension 77, and this extension is recessed at opposite sides and is shaped to form the bearings 78 and trunnions 79. The slide bars 73 are received in the recesses of the extension 77, and bearing blocks 80 and 81 are mounted on the bearings and the trunnions respectively to fit against the slide bars 73 on their lower and upper faces. Stub bolts 82 are mounted in the upper flanges of channel bars 10 adjacent the inner ends of the side bars 73, and bearing eyes 83 are swiveled in the side bars and are received around stub bolts 82. Adjusting nuts 84 and 85 are turned on to the stub bolts above and below bearing eyes 83 and by manipulation of these adjusting nuts the disposition of the side bars 73 with respect to channel bars 10 can be varied. On one of the end trunnions 86, by which the cam roller 69 is journaled, a worm gear 87 is fixed. A shaft 88 is revolubly mounted in a suitable bearing adjacent the worm gear and a worm 89 on this shaft meshes with worm gear 87. A hand wheel 90 is fixed on shaft 88. As has been stated, adjustment of nuts 84 and 85 will vary the disposition of the inner ends of side bars 73, and by manipulation of hand wheel 90 worm 89 meshing with gear 87 will cause cam roller 69 to be turned and to raise or lower the remaining ends of bars 73. As bearing blocks 80 and 81 fit rather snugly upon the slide portions of bars 73, cutter head 31 will be raised or lowered by sliding within the way 30, or will be carried in a horizontal plane, depending upon the setting of bars 73.

The parts as described rest and are supported almost entirely upon I-beam 1, and to all intents and purposes beam 2 is not required as support for this structure, however, beam 2 performs an important function in carrying the plate supporting and clamping structure, the parts of which are shown in detail in Figs. 18, 19, and 20. A plate 91 is mounted and secured on the upper flange of beam 2, and at intervals tapered blocks 92 are fixed on this plate. A plate 93, similar to plate 91, having a longitudinal slot 94 in the lower side thereof, is placed above and parallel with the first mentioned plate, and wedge blocks 95 are provided with key extensions 96 to be received in the longitudinal slot 94 and are shaped to fit the upper faces of blocks 92. Block 92 is provided with a slotted way 97, while block 95 has a registering way 98, and a bar 99 is provided to extend between plates 91 and 93 and through the registering ways 97 and 98 of each pair of wedge blocks. Stops 100 and 101 are provided in pairs and slightly spaced, on bar 99 to bear at opposite sides against the key portion 96 of block 95, while the rod or bar 99 is shaped to slide freely within the way 97. Pins 102 depend from plate 93 and extend through openings in plate 91 to hold against endwise or lateral shifting of plate 93 with respect to plate 91. One end of rod 99 is screw threaded as at 103, and a hand wheel 104 having an internally threaded bore is turned on to this threaded end. Brackets 105 and 106 retain the hand wheel 104 in a fixed position, or swivel mounting is accomplished in some other approved manner.

An idler roll 107 is journaled at its ends in suitable bearings provided in brackets 108. These brackets 108 have slotted openings therethrough and clamp bolts 109 are passed through these slotted openings and are turned into threaded openings in plates 3 and 4. Plates 3 and 4 are extended somewhat beyond I-beam 2, and bracket members 108 are mounted adjacent their extremities to thus dispose roll 107 at a point to support the plate being worked away from that edge which will rest upon plate 93. As the channel bars 10 extend somewhat away from the base member 8, there will be a tendency to bear down upon the metal plate being worked and dragging will occur when a plate is put in place or withdrawn, to overcome which objection it is desirable that counterweights be provided as at 110.

While the crank disks 46 and 47 might be turned in any desired manner to cause operation of the machine, this turning movement is perhaps best accomplished through a worm 111 meshing with the teeth of the two-part worm gear designated at 48 and 48'. This worm is fixed on a shaft 112 which is in turn joined with the shaft of a motor 113 carried on suitable supporting bracket 114.

The use of the machine and the operation will be as follows:

It will of course be understood that the machine will be so located that proper clearance will be provided on that side at which roll 107 is mounted for proper handling and swinging of the metal plates to be scarfed, and while the plates will doubtless be handled to best advantage by the use of cranes, rolls as indicated by the dotted lines at 115, one of the standard forms of plate supporting and moving tables, or in fact any arrangement might be employed in this connection. With clamp nuts 19 loosened to release clamping member 16 so that counterweight 110 will slightly raise and elevate the outer ends of bars 110, and wedge blocks 95 slid down to lower plate 93, the metal plate is placed upon roll 107 and is moved forward to butt against member 16. In this relation the metal plate will rest upon plate 93 and roll 107 with sufficient friction bearing to hold against sliding or shifting, and by turning hand wheels 24 and 25 the carriage is shifted to bring the cutter head in line with that point on the metal plate at which a scarf is to be cut. When proper adjustment has been made clamp nuts 19 are tightened to set the carriage in the adjustable position, this operation also causing channel bars 10 to be swung down against the upper side of the metal plate. Hand wheel 104 is then turned to force plate 93 up against the under side of the metal plate and this plate 93 acts to clamp the edge of the metal plate where the same is to be cut and to give a firm and rigid bearing for the same.

Through the medium of adjusting nuts 84 and 85, the bars 73 are adjusted to a position in which the cutting tools of the cutter head 31 will strike and commence to cut into the metal plate at a distance from the edge equivalent to the length of scarf which is to be cut. When this setting and adjustment of the parts has been made, hand wheel 90 is manipulated to rotate eccentric roller 69 so that at the end of its forward strike the cutter head will have been depressed approximately one-sixteenth of an inch, or any other distance representing the depth of cut to be taken or the maximum capacity of the cutting tools.

The motor 113 is now started and through worm 111 and the worm gear, crank disks 46 and 47 are rotated. Through the toggle link arrangement and connection from these crank disks to cutter head 31, reciprocatory movement is imparted to the cutter head. As the cutter head moves forward the gouging edges of the cutting tools will strike the metal plate at a point representing the maximum length of the scarf to be cut and will cut gradually deeper as indicated by the dotted lines of Fig. 9, through to the end of the stroke. For each successive stroke hand wheel 90 is manipulated to give greater depression to bars 73 at those ends controlled by cam roller 69, and thus successive cuts each starting at the given point and each cutting a chip of gradually increased thickness toward the end of the stroke will be taken. Through the toggle link arrangement the speed of movement of the cutter head decreases and the moving power applied thereto increases toward the end of the stroke, and in the same ratio manipulation of hand wheel 90 will cause the cut to be deepened. Also, as the cutting tools take a gouging cut with the edge 63 and a smoothing cut with edge 64, less power is required for a given depth of cut for each stroke. As the cutting tools are free to swing up during back travel of the cutter head chattering at this time or damage to the tools through engagement with metal chips is avoided, and as the tools are independently hinged or pivoted, one or several of the same can be swung up to be retained in the inoperative position by corresponding spring finger 67, and in this way the width of cut can be varied from the width of one cutting tool through successive degrees up to a width representing a combination of the several tools.

While hand feed will be satisfactory to operate the depth adjusting means for the cutter head, under some circumstances, the machine will prove more efficient if a mechanical depth feed, automatic in its operation, be provided in lieu of this hand feed, and for this purpose the structure disclosed in Figs. 21, 22, 23, and 24 has proven efficient. The shaft 88 and worm 89 are dispensed with in this connection, and shaft 116 having worm 117 thereon is mounted in bearings 118 and 119 in such relation that the worm meshes with worm gear 87. A hand wheel 120 is provided on shaft 116 by which this shaft is manually revolved when a hand feed is to be accomplished. A sleeve 121 is loosely fitted on the shaft to be confined against longitudinal movement on the shaft by bearing 119 at one end and by a ratchet wheel 122 at its opposite end. Ratchet wheel 122 is fixed on shaft 116. Collars 123 and 124 are fitted on sleeve 121 adjacent its ends and set screws 125 and 126 are provided to set these collars upon the sleeve and hold the same against turning with respect thereto. A flexible spline 127 is secured at its ends to collars 123 and 124, and the arrangement is such that as one collar is released through loosening of the set screw and is turned, the spline will be warped around sleeve 121 on a helicoidal curve. Bearing 119 has a slotted guide way 128 extending therefrom and parallel with sleeve 121, a slide 129 being mounted in this guide way. Slide 129 has friction rolls 130 and 131 mounted on the inner side thereof and spaced sufficiently to receive the flexible spline, as shown in Fig. 24, and thus as slide 129 is moved along the length of guide way 128, these friction rolls will engage with the spline and will cause sleeve 121 to be turned upon shaft 116. An arm 132 is secured in conjunction with collar 124 to swing adjacent 122 as sleeve 121 is turned, and this arm 132 has a ratchet pawl 133 pivoted at the outer end thereof and urged by spring 134 to engage with the teeth of ratchet wheel 122. A pitman rod 135 connected on pin 50 of crank disk 47 is connected at its opposite end with a slide 129, and thus as the machine is operated slide 129 will be reciprocated in the guide way and through turning movement imparted to sleeve 121 arm 132 will be swung with the ratchet pawl in engagement with the teeth of ratchet wheel 122 to cause turning of shaft 116 and worm 117. This movement imparted to the worm will cause worm gear 87 to turn and revoluble movement will be imparted to cam roller 69 to lower side bars 73 and to consequently accomplish an automatic depth feed for the cutter head. Spline 127 can be warped around sleeve 121 in either direction, and thus the parts may be made to function for turning of worm 117 either upon the forward or return movement of slide 129.

While this automatic feed might be disconnected or rendered inoperative by setting collar 123 on sleeve 121 in such relation that the flexible spline 127 will extend parallel with the axis of turning of the sleeve, this requires stopping of the machine, and as it is oftentimes desirable to stop the depth feed for the cutter head while the machine is still in operation, it is preferable that means be provided to throw the automatic feed out of operation. One form of such means is illustrated in Figs. 25, 26, and 27. Bearing 118 in which shaft 116 is journaled is provided with an extension 136 having a bearing opening 137 therein. A support bearing 138 is mounted on the frame portion of the machine and has a bearing shaft 139 journaled therein and held against displacement by the head 140. This bearing shaft has an eccentric extension 141 projecting beyond the supporting bearing and received in the bearing opening 137 of the extension 136. This extension is slotted as at 142, and a shifting lever 143 fixed on the eccentric portion 141 of shaft 139 works in this slot 142. When shifting lever 143 is swung to the position shown in Figs. 25 and 27, worm 117 is moved to a position in mesh with gear 87, and when the shifting lever is swung to the opposite extreme position the eccentric extension 141 raises bearing 118 and consequently moves worm 117 from the meshing relation.

In Fig. 28 I have illustrated an adaptation of the invention as a portable machine and also shown a somewhat different power applying means, fluid being here employed. Side bars 144 similar to the side bars illustrated in the preferred embodiment are mounted in spaced relation and have guide ways 145 fitted in the channels thereof. A slide head 146 is mounted to travel in the guide ways, and a cutter head 147 of the style hereinbefore described or of any other suitable type is carried by the slide head to have vertical feeding movement. A stop plate 148 is secured across beneath the forward ends of side bars 144. Clamp bars 149 are positioned below side bars 144 and are connected by cross bars 150. Clamp bolts 151 pass through side bars 144 and through the middle portions of clamp bars 149, clamp nuts 152 are turned on the screw threaded ends of bolts 151 to tighten against clamp bars 149, handles 153 being provided for more ready manipulation of said clamp nuts. An angle bar 154 is secured across the forward ends of side bars 144, nuts 155 being mounted in conjunction therewith and in line with clamp bars 149. Clamp screws 156 having handles 157 are turned through these nuts 155 and bear against the outer ends of bars 149, to exert swinging force thereagainst with the bearing upon clamp nuts 152 as a fulcrum. When the machine is to be used, it is carried by hand, lifted by crane, or otherwise transported to the plate to be scarfed, the plate having previously been blocked up or elevated on horses. With clamp nuts 152 and clamp screws 156 loosened to allow clamp bars 149 to drop and be spaced from side bars 144, these side bars are placed with their inner ends on the plate and the machine is slid on to the plate until the forward edge thereof butts against stop plate 148. Clamp nuts 152 are then tightened to bring cross bars 150 into clamping engagement against the lower side of the metal plate, and to secure a still more firm setting clamp screws 156 are turned down against bars 149.

While the same means might be employed to move slide block 146, as shown in Fig. 28, as is used in the preferred embodiment of my machine, I have illustrated an adaptation in which motive power is taken from a fluid cylinder. Links 158 and 159 are pivoted on pins 160 and 161 carried by slide 146 and side bars 144 respectively, and are hinged together by pin 162. On bearing extension 163 a cylinder 164 is swung by trunnions 165, and a piston 166 mounted to slide within cylinder 164 is connected on piston rod 167. This piston rod in turn is connected with pin 162 by which links 158 and 159 are hinged. A fluid chest 168 is provided at one side of the cylinder and a link 169 is connected with link 159 and arranged to operate a valve within the fluid chest. A fluid supply pipe or hose is connected with the fluid chest.

Any form of cutter depth adjustment might be employed in conjunction with the machine as above specified, the adaptation here illustrated being substantially the same as that disclosed in Fig. 6.

In Figs. 29 and 30 a modified form of cutter depth feed is shown applied to a machine constructed after the manner of Fig. 28, although it is to be understood that this depth feed might be used with the preferred form of machine as well. Duplicated parts of the machine are referred to by similar reference characters, and only the depth feed structure which is not included in Fig. 28, will be described in detail. Bracket plates 171 are mounted on side bars 144 in front of bearing plates or extensions 163, and a shaft 172 is connected across between these bracket plates. Cutter head 173 has an extension 174 which is formed into a bearing, and links 175 are pivoted on this bearing portion. Links 176 are swung on shaft 172, and are hinged to links 175 by pin 177. A two-part rod 178 is hinged at one end on pin 177 and at its opposite end is swung on pin 179, the adjacent ends of this two-part rod being oppositely threaded and having turn buckle 180 received thereon. In operation, a link 158 is swung down, drawing force is exerted upon rod 178 and in consequence links 175 and 176 are manipulated to lower or move down cutter head 173 so that the cut as taken by the cutting tools of the head is deepened.

In Figs. 31 and 32 yet another modified form of cutter depth feed is shown. As here illustrated, the substantially U-shaped member 181 has the side bars 182 thereof formed as slides, and this member has the side bars adjustably mounted by stub bolts 183, after the manner of the mounting disclosed in Fig. 10. The cross bar of the U-shaped formation is provided with an opening 184 in which a wheel 185 is given swivel mounting. A cross bar 186 carried by the side bars 187 of the frame of the machine is provided with an opening 188, and a screw 189 has a head 190 thereon which is received in this opening. A pin 191 pivots screw 189 within the opening. Wheel 185 has a central opening 192 which is threaded to receive screw 189, and when the wheel is turned on to the screw support is provided for the forward end of frame portion 181, this support being adjustable as the wheel is turned. Wheel 185 has a plurality of outstanding lugs or arms 193, which arms are preferably equidistantly spaced around the periphery of the wheel. A bracket arm 194 is mounted and secured on the top of extension 195 of cutter head 196, by means of cap screws 197, or in any other approved manner. This bracket arm has a bearing 198 at its outer end, and a pawl finger 199 is pivoted at this bearing by pin 200. This pawl finger 199 is free to have swinging movement toward the extension of the cutter head, but movement thereof in an opposite direction beyond the perpendicular is prevented by a stop 201. A spring catch 202 is positioned on bracket arm 194 at a point to catch the extremity of the pawl finger 199 when the same is swung to a raised position.

Bracket arm 194 is located somewhat to one side of the center of screw 189, and thus as cutter head 196 moves on the forward stroke pawl finger 199 is swung back to clear certain of the lugs or projections 193. Upon the return stroke of the slide head the pawl finger is held against reverse swinging movement by stop 201, and thus through engagement with certain of the lugs wheel 185 will be turned upon screw 189. As wheel 185 is revolved about screw 189, the U-shaped member is lowered or given greater incline and in consequence as the cutter head is reciprocated the cutter tools will cut deeper with each successive stroke.

With the modified power means as shown in Fig. 28, and with each of the other modifications as shown or suggested, the operation will be substantially the same as with the preferred embodiment, in view of which it is not thought that recapitulation need here be indulged in.

While, in the foregoing, I have set forth a structure intended to be used in cutting inclined or straight scarfs, by changing the form of the guide bars by which the depth feed of the cutter is accomplished, the cutting tools might be guided to cut on circular, parabolical, serpentine or irregular lines and the machine will operate with the same efficiency. Also, it will be appreciated that while only certain possible modifications have been mentioned in conjunction with the specific embodiments shown and described, my purpose is to provide a machine which will accomplish the various purposes and objects as outlined in the fore part of these specifications, in view of which it is to be understood that in practice I do not limit myself to such specific details as herein set forth, but may resort to any practical modifications falling within the scope of the invention as defined in the appended claims. Also, whereas the mechanical structure as outlined will accomplish the method of scarfing metal by the use of a moving cutter which consists in initiating the movement of the cutter, continuing the travel with decreasing speed and increasing power applied, and deepening the cut; it will be understood by those skilled in the art that other mechanical means might be used so long at it will function to accomplish the method as set forth in the claims.

I claim:

1. A machine for scarfing metal including with a cutting tool, means to feed said tool to accomplish a deepening cut, and power means acting to increase the force applied to said cutting tool as the cut is deepened.

2. A machine for scarfing metal including with a cutting tool, means to feed said tool to accomplish a deepening cut, power means acting to increase the force applied to said cutting tool as the cut is deepened, means to hold a piece of metal in a position to be worked upon, and means to adjust the parts to a proper position with respect to the location at which a scarf is to be cut.

3. A machine for scarfing metal including with a cutting tool, means to feed said tool to accomplish a deepening cut, power means acting to increase the force applied to said cutting tool as the cut is deepened, and means to simultaneously operate the cutter depth feed and the moving means therefor.

4. A machine for scarfing metal including with a cutting tool, means to feed said tool to accomplish a deepening cut, power means acting to increase the force applied to said cutting tool as the cut is deepened, and means by which the speed of depth feed for the cutting tool is varied.

5. A machine for scarfing metal including with means clamping to the metal, a movable cutter head, means by which depth feed is imparted to said cutter head, and means to move said cutter head in a cutting path.

6. A machine for scarfing metal including with a movable cutter head carrying cutting tools, an arrangement of toggle links upon movement of which the cutter head is carried to travel in a cutting path, means to impart movement to said toggle links, and means by which said cutter head is given depth feed when traveling on its cutter stroke.

7. A machine for scarfing metal including with a movable cutter head carrying cutting tools, an arrangement of toggle links upon movement of which the cutter head is carried to travel in a cutting path, means to impart movement to said toggle links, means by which said cutter head is given depth feed when traveling on its cutter stroke, and means by which said depth feed is controlled during operative movement of said cutter head.

8. A machine for scarfing metal including with a cutter head adapted to have cutting movement imparted thereto, a plurality of cutting tools carried by said cutter head mounted to be selectively swung into and out of cutting positions, means to hold said cutting tools when swung out of a cutting position, and a toggle link arrangement to impart movement to said cutter head.

9. A machine for scarfing metal including with a cutter head adapted to have cutting movement imparted thereto, a plurality of cutting tools carried by said cutter head mounted to be selectively swung into and out of cutting positions, a toggle link arrangement to impart movement to said cutter head, and means by which said toggle link arrangement is actuated to move said cutter head in a cutting path.

10. A machine for scarfing metal including with a cutting tool carried to have movement in a cutting path, means by which said cutting tool is fed to deepen the cut as the cutting stroke is traveled, and means to impart movement to said cutting tool with increased power applied throughout the length of the cutting stroke.

11. A machine for scarfing metal including with a cutting tool carried to have movement in a cutting path, means by which said cutting tool is fed to deepen the cut as the cutting stroke is traveled, and an arrangement of toggle links by which said cutter head is moved with increased power applied toward the end of the stroke.

12. A machine for scarfing metal including with a supporting structure adapted to receive a plate to be scarfed, and a carriage movably mounted on said supporting base to be adjusted with respect to said plate to be disposed at points where the same is to be scarfed, cutting means mounted on said carriage to scarf said plate, and means by which said carriage is clamped with respect to said supporting base to be locked in set positions.

13. A machine for scarfing metal including with a supporting base to receive a metal plate to be scarfed, a carriage movably mounted on said supporting base to be adjusted to positions at which the plate is to be scarfed, means by which said carriage is moved, a cutter head movably mounted on said carriage, and means by which said cutter head is moved to scarf the plate.

14. A machine for scarfing metal including with a supporting base to receive a metal plate to be scarfed, a carriage movably mounted on said supporting base to be adjusted to positions at which the plate is to be scarfed, means by which said carriage is moved, a cutter head movably mounted on said carriage, means by which said cutter head is moved to scarf the plate, guide means to hold said cutter head to proper movement on cutting strokes, and mechanically operated means to adjust said guide means for successive cutting strokes of said cutter head.

15. A machine for scarfing metal plates including with a supporting base to receive a plate to be scarfed, a carriage mounted on said supporting base, means to swing said carriage up to clear the plate as the same is placed therebeneath and in a position to be worked upon, a cutter mounted on said carriage, and means to clamp said carriage down upon the plate in such relation that the cutter will scarf the same.

16. A machine for scarfing metal adapted to cut different widths of scarf including with supporting structure, a cutter head to be moved in cutting paths, a plurality of cutting tools hinged within said cutter head, said cutting tools being mounted to be selectively swung into and out of working positions, and means to hold said cutting tools when moved from cutting positions.

17. A machine for scarfing metal adapted to cut different widths of scarf including with supporting structure, a cutter head to be moved in cutting paths, a plurality of cutting tools hinged within said cutter head, said cutting tools being mounted to be selectively swung into and out of working positions, means to hold said cutting tools when moved from cutting positions, and means by which said cutter head is fed to take deepening cuts in the metal with said cutting tools.

18. A machine for scarfing metal including with a main supporting structure, a slide head mounted for reciprocatory movement, a cutter head movably mounted on said slide head and provided with cutting tools, an arrangement of toggle links pivoted in connection with said slide head and said supporting frame structure, means to give deepening feed to said cutter head as the cutting stroke is carried through, and power means connected to apply increasing power to said toggle link arrangement as the depth of cut is increased.

19. A machine for scarfing metal including with a cutter head, means to impart reciprocatory movement to said head, guide bars pivoted adjacent one end by which said cutter head is given depth feed, and means by which said guide bars are depressed and elevated at their free ends.

20. A machine for scarfing metal including with a cutter head, means to impart reciprocatory movement to said head, guide bars pivoted adjacent one end by which said cutter head is given depth feed, means by which said guide bars are depressed and elevated at their free ends, and means by which said guide bar depressing means is mechanically actuated during operation of the machine.

21. A machine for scarfing metal including with a cutter head, means to impart reciprocatory movement to said head, guide bars pivoted adjacent one end by which said cutter head is given depth feed, means by which said guide bars are depressed and elevated at their free ends, means by which said guide bar depressing means is mechanically actuated during operation of the machine, and means to render said mechanically actuated means inoperative.

22. A machine for scarfing metal including with a cutter head carrying cutting tools and adapted to have reciprocatory movement, guide bars each pivoted adjacent one end and arranged to impart depth feed to the cutting tools carried by said cutter head and adapted to be depressed at their swinging ends to cause deepening of the cut throughout the length of cutting strokes, and means to impart reciprocatory movement to said cutter head arranged to move the same at decreasing speed and with increasing force throughout the cutting stroke.

23. A machine for scarfing metal including with a cutter head carrying cutting tools and adapted to have reciprocatory movement, guide bars each pivoted adjacent one end and arranged to impart depth feed to the cutting tools carried by said cutter head and adapted to be depressed at their swinging ends to cause deepening of the cut throughout the length of cutting strokes, and a toggle link arrangement to impart reciprocatory movement to said cutter head arranged to move the same at decreasing speed and with increasing force throughout the cutting stroke.

24. A machine for scarfing metal including with a cutter head carrying cutting tools and adapted to have reciprocatory movement, guide bars each pivoted adjacent one end and arranged to impart depth feed to the cutting tools carried by said cutter head and adapted to be depressed at their swinging ends to cause deepening of the cut throughout the length of cutting strokes, means to impart reciprocatory movement to said cutter head arranged to move the same at decreasing speed and with increasing force throughout the cutting stroke, and means to swing said guide bars mechanically to accomplish the depth feed.

25. A machine for scarfing metal including with a cutter head carrying cutting tools and adapted to have reciprocatory movement, guide bars each pivoted adjacent one end and arranged to impart depth feed to the cutting tools carried by said cutter head and adapted to be depressed at their swinging ends to cause deepening of the cut throughout the length of cutting strokes, means to impart reciprocatory movement to said cutter head arranged to move the same at decreasing speed and with increasing force throughout the cutting stroke, means to swing said guide bars mechanically to accomplish the depth feed, and power means to operate said means by which the cutter head is reciprocated and to actuate the guide bar swinging means.

26. A machine for scarfing metal including with a cutter head carrying cutting tools and adapted to have reciprocatory movement, guide bars each pivoted adjacent one end and arranged to impart depth feed to the cutting tools carried by said cutter head and adapted to be depressed at their swinging ends to cause deepening of the cut throughout the length of cutting strokes, a toggle link arrangement to impart reciprocatory movement to said cutter head arranged to move the same at decreasing speed and with increasing force throughout the cutting stroke, and crank disks revolubly mounted and having pitman rods connected therewith and with the toggle links to actuate the same.

27. A machine for scarfing metal including with a slide head having a cutter head carried thereby and movably mounted, guide bars each pivotally mounted adjacent one end, means to reciprocate said slide head and cause cutter head to be given depth feed as said guide bars are depressed at their swinging ends, and cam means to depress said guide bars to accomplish the depth feed.

28. A machine for scarfing metal including with a slide head having a cutter head carried thereby and movably mounted, guide bars each pivotally mounted adjacent one end, means to reciprocate said slide head and cause cutter head to be given depth feed as said guide bars are depressed at their swinging ends, cam means to depress said guide bars to accomplish the depth feed, mechanical means to actuate said cam means, and power means by which said cam operating means is rendered inoperative.

29. A machine for scarfing metal including with a slide head having a cutter head carried thereby and movably mounted, guide bars each pivotally mounted adjacent one end, means to reciprocate said slide head and cause cutter head to be given depth feed as said guide bars are depressed at their swinging ends, cam means to depress said guide bars to accomplish the depth feed, mechanical means to actuate said cam means, and power means by which said slide head moving means is operated and said cam moving means is actuated simultaneously.

30. A machine for scarfing metal including with a slide head having a cutter head carried thereby and movably mounted, guide bars each pivotally mounted adjacent one end, means to reciprocate said slide head and cause cutter head to be given depth feed as said guide bars are depressed at their swinging ends, cam means to depress said guide bars to accomplish the depth feed, mechanical means to actuate said cam means, power means by which said slide head moving means is operated and said cam moving means is actuated simultaneously, and means to render said cam moving means inoperative.

31. A machine for scarfing metal including with a slide head having a cutter head carried thereby and movably mounted, guide bars each pivotally mounted adjacent one end, means to reciprocate said slide head and cause cutter head to be given depth feed as said guide bars are depressed at their swinging ends, cam means to depress said guide bars to accomplish the depth feed, and spiral means for turning said cam intermittently to adjust said bars to give depth feed for successive cutting strokes.

32. A machine for scarfing metal including with a slide head having a cutter head carried thereby and movably mounted, guide bars each pivotally mounted adjacent one end, means to reciprocate said slide head and cause cutter head to be given depth feed as said guide bars are depressed at their swinging ends, cam means to depress said guide bars to accomplish the depth feed, spiral means for turning said cam intermittently to adjust said bars to give depth feed for successive cutting strokes, and means by which said spiral means is adjusted to vary cutting feed imparted to said cam means.

33. That improvement in the method of scarfing metal by the use of a moving cutter which consists in initiating movement of the cutter, continuing the travel with decreasing speed and increasing power applied, and deepening the cut.

34. That improvement in the method of scarfing metal by the use of a moving cutter which consists in starting each successive cut at a common point and gradually deepening the cut toward the end of the cutting stroke.

35. That improvement in the method of scarfing metal which consists in cutting the same in successive strokes each commencing with an infinitesimal cut and gradually deepened toward the end of the cutting stroke.

In testimony whereof I affix my signature.

PHILANDER E. LANE.

Copies of this patent may be obtained for five cents each, by addressing the "Commissioner of Patents, Washington, D. C."